Sept. 5, 1967
A. H. HURST
3,340,386
COUNTER AND READOUT MEANS USEFUL FOR
MEASURING UNITS OF FLUID FLOW
Filed Sept. 24, 1963
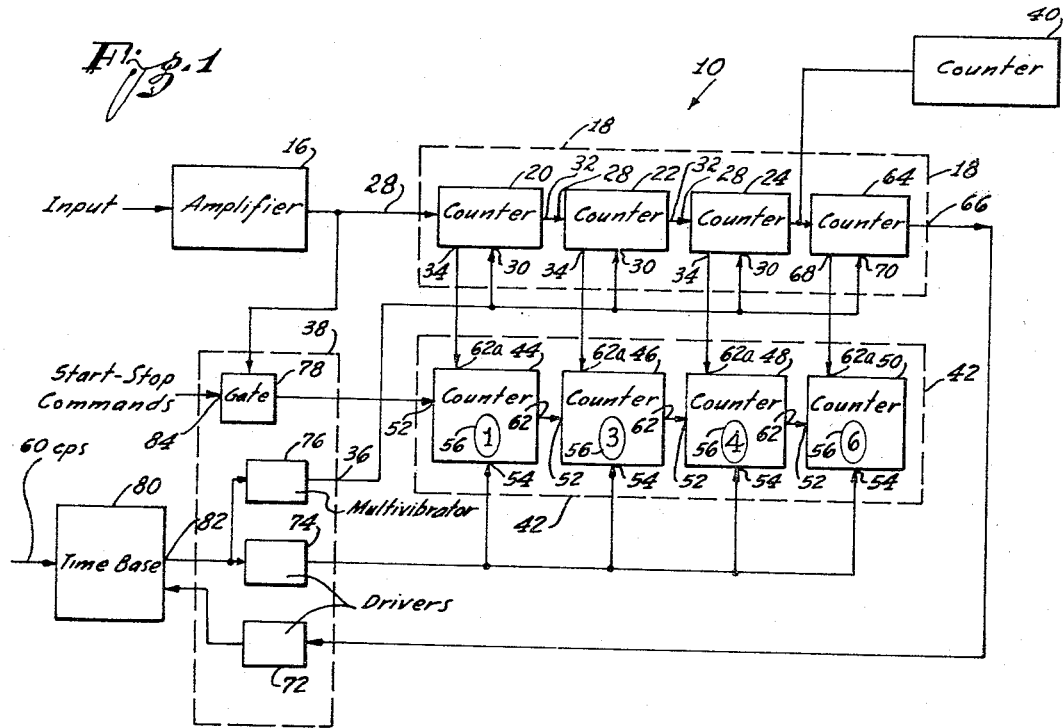
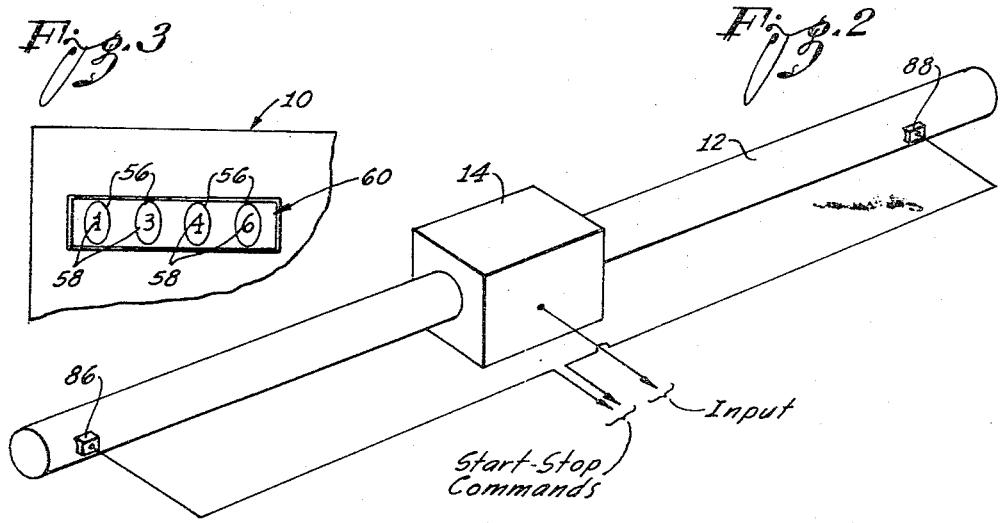
INVENTOR
Arthur H. Hurst
Attorneys

United States Patent Office 3,340,386
Patented Sept. 5, 1967

3,340,386
COUNTER AND READOUT MEANS USEFUL FOR MEASURING UNITS OF FLUID FLOW
Arthur H. Hurst, Manhattan Beach, Calif., assignor to Minnesota Mining and Manufacturing Company, St. Paul, Minn., a corporation of Delaware
Filed Sept. 24, 1963, Ser. No. 311,084
7 Claims. (Cl. 235—92)

ABSTRACT OF THE DISCLOSURE

This invention relates to a system for counting the number of occurrences of a phenomenon and for instituting a particular timing interval upon each occurrence of a particular count. At the end of the particular timing interval, the count in the counter is transferred to indicating means. The invention also relates to a system for indicating the time for the passage of a reference between first and second pickups.

---

The present invention relates to measuring means, and more particularly to means for individually counting the various items in a series.

At the present time, it is very frequently desirable to be able to accurately measure the individual items in a series of identical items or the units of certain materials as they continuously flow past a particular point. For example, in certain industrial processes, it may be desirable to accurately count the number of individual workpieces moving along an assembly line or to measure in units such as barrels of a substance such as petroleum flowing through a pipeline. In addition to being capable of obtaining a running count of the total, it is also desirable to be able to determine the instantaneous rate and to periodically check the accuracy of the measurements. One means for counting the number of units or quantity of material flowing is to provide a plurality of decade counters which are cascaded to accumulate a running count. In order to accumulate a count of the total quantity that has flowed over an extended period of time, the counter is started at the beginning of the period and stopped at the end of the period. Such an arrangement is effective to accumulate a running count of the total. However, it will provide no indication of the instantaneous rate at which the items are flowing. If it is desired to obtain a measurement of the instantaneous rate, it is necessary to clear the counters and to then permit them to run for a particular interval of time. The count accumulated during this interval will then permit a determination of the average rate at which the material is flowing during that particular instant or interval of time. Although this will produce an accurate rate of flow, it will destroy the total accumulated in the counter. As a result, no determination can be provided of the total quantity that has flowed over an extended period of time.

It is now proposed to provide means which will overcome the foregoing difficulties. More particularly, it is proposed to provide means which will be effective to permit the accumulation of a count of the total quantity of material flowing over an extended period of time and will also provide an indication of the instantaneous rate at which the material is flowing without in any way impairing the accuracy of the running total. It is also proposed to provide means that will permit the accuracy of counting being accumulated to be periodically checked without impairing the accuracy of the running total being accumulated.

These and other features and advantages of the present invention will become readily apparent from the following detailed description of one embodiment thereof, particularly when taken in connection with the accompanying drawings wherein like reference numerals refer to like parts, and wherein:

FIGURE 1 is a block diagram of a counting means embodying one form of the present invention;

FIGURE 2 is a perspective view of pickup means adapted to provide signals for actuating the counting means of FIGURE 1; and FIGURE 3 is a fragmentary view of the measuring system of FIGURE 1 showing the display portion.

Referring to the drawings in more detail, the present invention is particularly adapted to be embodied in a measuring system 10 for simultaneously accumulating a running count of the total volume of a material which has been transported over an extended interval of time and indicating the rate at which the material is flowing at any particular instant. Although the present measuring system 10 may be employed for measuring the flow of any of a wide variety of materials or items, in the present instance, the system is particularly adapted to measure the flow of a fluid such as petroleum through a pipe 12.

In order to sense the flow of the fluid through the pipe 12, a suitable pickup 14 is provided so that the fluid will flow through the pickup. The pickup 14 is effective to provide a signal such as a pulse each time a particular quantity of the material passes the pickup 14. By way of example, if it is desired to measure the number of barrels of petroleum that are passing through the pipe 12, the pickup 14 may be effective to provide a signal each time that some increment such as a thousandth of a barrel flows through the pickup 14. In the event that it is desired to measure the flow of other materials such as a series of separate parts, the signals may be generated in any desired manner such as one signal for each item.

The output of the pickup 14 is interconnected with the input to the measuring system 10 for feeding the signals thereto. The present input includes an amplifier 16 which is adapted to increase the amplitude of the input signals to a more useful level. In addition, the amplifier 16 may be effective to restore or change the shape of the signal to some particular form. For example, it may be desirable for the amplifier 16 to include a pulse shaping circuit effective to insure each of the input signals being a pulse of a fixed amplitude and time duration when it emerges from the amplifier 16.

The output of the pulse-shaping amplifier 16 is interconnected with the input to first counting means 18 so as to feed the shaped counting pulses thereto. The present counting means 18 includes three separate counters 20, 22 and 24, each of which includes a pair of inputs 28 and 30 and a pair of outputs 32 and 34. The first input 28 is adapted to supply the counting pulses to the counter whereby the counter will accumulate a count of the counting pulses as they occur. The first output 32 is effective to produce an output signal each time that the counter has accumulated a count equal to its capacity and starts a new cycle of accumulating a new count. The second output 34 is adapted to provide an output or transfer signal that is a function of the count that is stored in the counter each time a signal is present on the second input 30.

The first input 28 of the first counter 20 is connected directly to the output of the pulse-shaping amplifier 16. This counter 20 will thus receive all of the counting pulses. The first output 32 of the first counter 20 is interconnected with the first input 28 to the second counter 22, while the first output 32 of the second counter 22 is interconnected with the first input 28 of the third counter 24. It will thus be seen that the counters 20, 22 and 24 are cascaded so that each of the counters 20, 22 and 24 will be effective to transfer a count to the input of the succeeding counter each time the counter completes one cycle.

If the counters 20, 22 and 24 are of the decade type, i.e., count from 0 to 9 and repeat, the first decade counter 20 will be effective to count units and produce a pulse on the output 32 every ten signals. The second decade counter 22 will then count the tens pulses and produce hundreds pulses on its output 32. The third decade counter 24 will then count hundreds and produce thousands pulses on its output 32. The second or transfer inputs 30 to the decade counters 20, 22 and 24 may be connected to one of the outputs 36 from the control unit 38.

If, as previously suggested, the present measuring system 10 is being employed to measure the flow of petroleum and produces a counting signal each time that a thousandths of a barrel flows through the pickup 14, the pulses from the output 32 of the third decade counter 24 will represent the number of barrels that are flowing through the pickup 14.

Accordingly, if it is desired to measure the number of barrels that have flowed through the pickup 14, a counter 40 may be interconnected with the output 32 of the third decade counter 24. This counter 40 will thus advance by one unit each time a pulse is produced at the output 32 of the decade counter 40. The count accumulated on the counter 40 will thus corespond to the number of barrels of petroleum flowing through the pickup 14.

Normally, the rate at which a material such as petroleum flows through the pipe 12 will produce the counting signals at a rate that is far in excess of the ability of any mechanical counters to respond. However, the rate at which the pulses are produced at the output 32 of the counter 24 will be reduced by a factor of 1,000 to 1. As a consequence, the rate at which the pulses occur at the output 32 will normally be within the range at which an electromechanical counter 40 can respond. In this event, the counter 40 may be a simple electromechanical counter having a plurality of number wheels. These wheels will then be advanced by one count each time that 1,000 counting signals are produced by the pickup 14 and one pulse is produced at the output 32.

It may be seen that the counters 20, 22 and 24 and electromechanical counter 40 will operate continuously and that the counter 40 will be effective to indicate the runing total of the number of units such as barrels that have passed through the pickup 14 since the counting operation started.

In the event that it is desired to provide a continuous indication of the instantaneous rate at which the material is flowing through the pickup 14, second counting means 42 may be provided. This counting means 42 includes a plurality of counters 44, 46, 48 and 50 which may be of any conventional design. By way of example, these counters 44, 46, 48 and 50 may be of the decade variety so as to divide by 10 as described above. The counters 44, 46, 48 and 50 are in sufficient number to indicate a rate of flow that will be in excess of that normally expected. For example, if it is expected to measure rates such as thousands of barrels per hour, four separate counters 44, 46, 48 and 50 may be provided.

Each of the counters 44, 46, 48 and 50 includes an input 52 for receiving counting pulses and a portion that is effective to count the number of pulses as they feed to the input 52. In addition, each of the counters 44, 46, 48 and 50 includes a memory portion that is effective to retain, for extended periods of time, the count present in the counting portion. An input 54 may also be provided so that a signal thereon will cause the memory and counting portions to be cleared and reset to zero. In addition, each of the counters 44, 46, 48 and 50 includes a readout means effective to provide a visual display of the count stored in the memory section. The readout or display means may be of any desired variety but it has been found that neon tubes 56 such as the so-called Nixie tube manufactured by the Burroughs Corp. is well suited for this purpose. In such a tube, a plurality of electrodes 58 shaped like the numerals 0 through 9 are provided so that they will glow when energized. The faces of the tubes 56 are arranged in a display portion 60 so as to be visible to an operator. Each of the counters 44, 46, 48 and 50 may also include an output 62 that is effective to produce an output pulse each time that the counter has counted up to 9 and starts a new cycle of counting from 0 to 9.

The input 62a to each of the counters 44, 46, 48 and 50 may be interconnected with the second output 34 of the corresponding decade counter 20, 22 or 24. Thus, each time a transfer signal is applied to the inputs 30, signals corresponding to the count in the decade counter 20, 22 or 24 will be transferred into the memory section of the counters 44, 46, 48 and 50. The display portion 60 of the counters 44 to 50, inclusive, will then produce a visual display of the number transferred into the memory and stored therein. In the event there are more counters in the second counting means 42 than is required in the first counting means 18 to operate the electromechanical counter 40, an additional counter 64 may be connected to the output 32 of the third counter 24 to operate the most significant counter 50 in the second counting means 42. The counter 64 includes an output 66 for producing an output count, an output 68 for producing a transfer count, and an input 70 interconnected with the output 36.

The second input 52 to the first counter is connected with the count output of the control unit 38 whereby the second counting means 42 may receive the counting pulses therefrom. This will be effective to cause the counter 42 to receive the pulses and to repeatedly count them and produce a pulse on the output every ten pulses. The outputs 62 of the counters 44, 46 and 48 may be connected to the input of the succeeding counters whereby all of the counters in the second counting means 42 will be cascaded and count in a decade manner.

In order to control the operation of the counters 20, 22, 24, 44, 46, 48, 50 and 64 and the transfer of the counts from the counters 20 to 24 and 64 into the memories of the counters 44 to 50, inclusive, a control unit 38 is provided. The control unit 38 includes a pair of drivers 72 and 74, a time delay means 76 and a gate 78. The first driver 72 is connected to the input of a timer 80 that will trigger the timer. The timer 80 may be of any suitable variety capable of providing an accurately controlled time interval having a predetermined standard duration. By way of example, the timer 80 may be of a synchronous type interconnected with a standard 60 c.p.s. power line so as to determine the time interval by the number of cycles from the power line.

When a signal is fed from the driver 72 to the input of the timer 80, the signal will trigger the timer 80 and cause it to start measuring the standard time interval. At the end of the time interval, a timing pulse will be produced on the output 82 from the timer 80.

The signal for triggering the timer may be derived from several sources; however, in the present instance, the driver 72 is interconnected with the output 66 of the last decade counter 64 in the counting means 18. It may thus be seen that each time a pulse is produced at the output 66 of the first counting means 18, the time interval will commence. It should be noted that this pulse will always occur at the time that the first counting means 18 transfers from 9999 to 0000 and begins a new cycle of counting. In other words, at the beginning of each time interval produced from the timer 80, the first counting means 18 will be cleared and will begin its count simultaneously with the beginning of the time interval.

The output 82 of the timer 80 is interconnected by means of the multivibrator 76 in the control unit 38 with the transfer inputs 30 and 70 in each of the counters 20, 22, 24 and 64 in the first counting means 18. When the signal indicating the end of the standard time interval occurs, the pulse present on the output 82 will be effective to cause the count present in the counters 20, 22, 24 and 64 to be transferred to the memories in the counters 44 to 50 in the second counting means 42. This transfer will occur without in any way altering the progression of the running count being accumulated in the first counting means 18. In order to simplify the transfer of the count into the counters 44 to 50, it is desirable to clear the counters 44 to 50 before the transfer. Accordingly, the output 82 from the timer may be connected to the reset inputs 54 by the driver 74 and to the transfer inputs 30 by a delay line or the one-shot multivibrator 76. This will be effective to delay the transfer by an interval that is just long enough to permit a clearing of the counters 44 to 50.

Since all of the counters 20, 22, 24 and 64 in the first counting means 18 passed through 0 at the instant the time interval began, the count accumulated in the counters at the end of the time interval will be exactly equal to the number of counting signals generated in the pickup 14 during the time interval. This will be effective to represent the instantaneous rate at which the counting pulses are occurring. By the judicious choice of the length of the time base from the timer 80, the display produced by the display portions 60 of the counter may be read directly in any desired unit. For example, if as previously suggested the present measuring system 10 is being employed to measure the flow of petroleum through a pipe 12, and the pickup 14 produces a pulse every one thousandths of a barrel by making the time interval equal to the 3.6 seconds, the reading on the display portion 60 will indicate the rate of flow directly as barrels per hour.

Once a reading has been transferred into the memory of the counters 44 to 50, inclusive, the reading on the tubes 56 will be continuously displayed until the memory is cleared. This will occur at the end of each time interval as the time pulse from the timer 80 passes through the driver 74 and is applied to the re-set inputs 54. However, at the same time, the pulse will be applied to the transfer input 30 so as to transfer a new count into the memories of the counters 44 to 50, inclusive. It may thus be seen that a reading fed into the memory will be displayed for one time interval and then it will be updated at the end of each time interval by a new display representing the current rate at which the pulses are occurring. It should be noted that during each of the countings and updatings of the rate pulses in the second counting means 42, there will be no interference with or loss of the running count being accumulated in the first counting means 18.

In order to check the accuracy and/or to calibrate the present measuring system, the number of counting signals produced by the pickup 14 may be counted while a known volume of the material is transferred through the pickup 14. Although this may be accomplished in any suitable manner, in the present instance the gate 78 is provided in the control unit 38 for connecting and disconnecting the second counting means 42 with the output of the pulse-shaping amplifier 16. Normally, the gate 78 will be closed so as to prevent the transfer of the counting pulses to the counters 44 to 50, inclusive. However, when the gate 78 is opened, the counting pulses will be fed directly into the counters 44 to 50, inclusive, so that they will accumulate a total count of the pulses.

The control input 84 to the gate 78 may be interconnected with a pair of pickups 86 and 88 mounted on the pipe 12. The two pickups 86 and 88 are separated from each other by some predetermined length. By simple measurements, it will be possible to very precisely determine the exact volume of a material such as petroleum required to fill this section of pipe 12.

In order to provide a check on how accurately the flow is being recorded on the counter 40, the system 10 may be switched to the check mode. This will not affect the running total of the pulses in the first counting means 18, but it will clear the counters 44 to 50, inclusive, in the second counting means 42. It will also disable the timer 80 and prevent the transfer of any counts from the timer 80 to the transfer inputs 30 to the counters 20, 22, 24 and 64. A plug may then be placed in the pipe 12 upstream of both of the pickups. This plug is adapted to flow with the material and may be a so-called "rubber pig" that just fits inside of the pipe with enough clearance to slide therethrough.

As the petroleum flows through the pipe 12, the plug or pig will move past the first pickup 86 and actuate it. When the pickup 86 is actuated, it will produce a first or start command signal which will be fed to the control input 84 of the gate 78. This pulse will open the gate 86. When the gate 86 opens, it will permit the counting pulses to be fed from the output of the amplifier 16 to the input of the first counting means 18 and also the input of the second counting means 42. When this plug or pig has moved through the section of pipe 12 and reached the second pickup 88, it will trip the second pickup 88 and provide a second or stop command signal. This signal will be effective to cause the gate 78 to close again. This will not in any way affect the flow of counting signals to the first counting means 18, but it will stop the flow of counting signals to the second counting means 42. As a result, the second counting means 42 will have accumulated a count of the total number of counting pulses that occurred while the plug was moving between the two pickups 86 and 88. This count will be displayed on the face of the display 60 in the second counting means 42. When the plug or pig is sweeping through the pipe 12 a volume of material equal to the volume of the pipe 12 between the pickups 86 and 88 will have flowed through the pickup 14. Since this is a known amount, the reading on the face of the display means 60 should always be equal to this known amount. Thus, by making a comparison between the expected reading and the actual reading, a determination may be made as to the accuracy of the measurements. In the event there is some error, a suitable correction factor can be easily computed. It should be noted that the foregoing determination of the accuracy of the system may be made while a running total is being accumulated in the first counting means 18 without disrupting or impairing the accuracy of the running total being accumulated on the counter 40.

In order to employ the present invention for measuring the total amount of a material that flows through the pickup 14, the first and second counting means 18 and 42 may first be cleared. Following this, in order to make a check as to the operation of the system 10, a signal having the same frequency as the supply for the timer may be fed directly into the second counting means 42 for an interval equal to the interval of the timer 80. This should produce a predetermined number on the face of the display 60. For example, if the power source is 60 c.p.s. and the time interval is 3.6 seconds, the count should be 216. If the count is not equal to the predicted amount, either the counter 42 and/or the timer 80 is in error. In this event, suitable corrections should be made.

If the power line frequency and the timer 80 are operating correctly so as to produce the predicted number, the material may be allowed to begin flowing through the pipe 12 and the pickup 14. This will be effective to cause a series of counting signals to be generated at the pickup 14 each time one encrement of material flows through the pickup 14. These counting signals will flow through the pulse-shaping amplifier 16 to the first counting means 18. The counting means 18 will begin to accumulate a count of the signals as they occur. Each time that a thousand counting pulses occur, i.e., in the present instance one barrel has passed through the pickup 14, a count will be recorded in the counter 40. This counter 40 will continue to accumulate this running count as long as the material continues to flow.

As the flow progresses, each time that ten counts are recorded in the counter 40, a pulse will flow from the output 66 to the driver 72 and the input of the timer 80. This pulse will occur just as the counters 20, 22, 24 and 64 pass from 9999 to 0000 and begin a new counting cycle. The timer 80 will then allow the predetermined or standard time interval to elapse. At the end of this time interval, a pulse will occur at the output 82. This pulse will be fed to the inputs 54 so as to clear the counters 44 to 50, inclusive, and a short interval thereafter to be transfer inputs 30 of the first counting means 18. This will cause the count in the first counting means to be transferred into the counters 44 to 50, inclusive, in the second counting means 42. This will not affect the running count being accumulated in the counter 40. However, since the count in the first counting means 18 was 0000 at the beginning of the time interval, the count transferred into the second counting means 42 will be equal to the number of pulses occurring during the time interval. This count will be displayed on the face of the display portion 60 of the second counting means 42 as the rate of flow. The operator may then observe this reading and make any necessary adjustments in the rate of flow. The next time the first counting means passes through 9999, a pulse will occur on the output 66 and will be fed to the timer 80 so as to begin a new count. At the end of the new count, the second counting means 42 will be cleared and the new rate count transferred into the second counting means 42 for display on the tubes 56.

If it is desired to check the accuracy of the measurements or to calibrate the system 10 during the period that a running count is being made, the system may be switched to the calibrate mode. A plug or rubber pig is then allowed to move along the pipe 12 between the two pickups 86 and 88. This will be effective to gate second counting means 42 ON and OFF while a known volume passes through the pickup 14. The reading displayed on the display portion of the second counting means will then be an indication of the accuracy of the system 10.

While only a single embodiment of the present invention is disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. A device for measuring the transfer of a material, comprising the combination of:
   a pickup responsive to the transfer of said material to produce a flow signal each time that a predetermined increment of said material is transferred,
   a counter interconnected with said pickup for continuously receiving a series of said flow signals, said counter having first and second portions for accumulating a count over an extended period of time of the total number of said signals occurring since the beginning of said period,
   means interconnected with the first portion of said counter to produce a timing signal each time the count is said first portion is equal to zero,
   first indicating means interconnected with said counter for indicating the total count accumulated by said counter,
   a counter for accumulating a count of said flow signal,
   second indicating means for indicating the count accumulated in said first portion and indicating the count accumulated in said second counter,
   timing means interconnected with said first means and said first portion of said counter, said timing means being responsive to said timing signal and effective to transfer the count in said first portion of said first counter to said second indicating mean a predetermined interval of time after said timing signal, and
   gating means for interconnecting said second counter with said pickup during an interval equal to the time required to transfer a reference quantity of said material past said pickup.

2. In combination for measuring the successive occurrence of a particular event,
   pickup means responsive to the transfer of said material to produce a series of flow signals each occurring at a succesive occurrence of the particular event,
   counting means interconnected with said pickup means for continuously receiving the series of flow signals and accumulating a count in accordance with the particular number of signals received,
   indicating means operatively coupled to the counting means for providing for an indication of the number of said signals counted by said counting means,
   timing means interconnected with the counting means for initiating a particular timing period upon each occurrence of a particular count by the counting means, and
   means interconnected with said counting means and said indicating means and said timing means to transfer the count in said counting means to said indicating means at the end of each particular timing period so that said indicating means will indicate the number of signals counted by said counting means during such particular timing period.

3. In combination for measuring the transfer of a material,
   pickup means responsive to the transfer of said material to produce a series of flow signals each occurring at a time that a particular increment of said material is transferred,
   counting means interconnected with said pickup means for continuously receiving the series of flow signals and accumulating a count of the total number of said signals,
   indicator means operatively coupled to said counting means for providing for an indication of the number of said signals counted by said counting means, said indicator having a memory for indicating said number for extended periods of time and until the introduction of the next number from the counting means,
   timing means interconnected with the counting means for producing a timing signal for a particular period of time upon each occurrence of a particular count in the counting means, and
   means interconnected with said counting means and said indicating means and said timing means to transfer the count in said counting means to said indicator means at the end of each timing signal, said indicating means being responsive to the magnitude of the count transferred thereto for indicating said number until the next transfer.

4. In combination for measuring the successive occurrences of a particular event,
   pickup means responsive to the transfer of said material to produce a series of flow signals each occurring at a successive occurrence of the particular event,
   counting means interconnected with said pickup means for continuously receiving the series of flow signals and accumulating a count of the total number of said signals,
   indicator means operatively coupled to the counting means for providing for an indication of the number of said signals counted by said counting means,
   means interconnected with said counting means and responsive to a particular count in said counter to produce a timing signal, and
   timing means interconnected with said last means and said counting means and providing a particular timing interval after the production of said timing signal, said timing means being responsive to said timing signal to transfer the count in said counting means to said indicating means at the end of said particular timing interval.

5. In combination for measuring the transfer of a material,
   first means responsive to the transfer of increments of said material to provide a cumulative count of the number of increments of said material transferred,
   a first indicator interconnected with said first means to indicate the total number of said increments counted by said first means, second means responsive to the transfer of increments of said material for providing a count of a number of said increments transferred, a pickup responsive to the beginning and ending of the transfer of a reference quantity of said material containing a particular number of said increments, means interconnected with said pickup and with said second means to actuate said second means only during the interval that said reference quantity is being transferred, and a second indicator interconnected with said second means to indicate the number of increments counted by said second means during said interval when said reference quantity is transferred.

6. In combination for measuring the transfer of a material including a reference quantity of the material, a first pickup responsive to the transfer of said material to produce a series of signals each occurring at a time that a particular increment of said material is transferred, a second pickup displaced from the first pickup and responsive to the transfer of the reference quantity of said material to indicate the interval required for said reference quantity to be transferred between the first pickup and the second pickup, first counting means interconnected with said first pickup for continuously receiving said series of signals and accumulating a count of the total number of said signals, second counting means having an input for providing for a transfer of counts from the first counting means to the second counting means and for providing for a count of the time interval between the movement of the reference material between the first and second pickups, timing means operatively coupled to the first counting means for providing for the production of a particular timing interval upon each occurrence of a particular count in the first counting means, means operatively coupled to the first and second counting means and to the timing means for obtaining a transfer of the indications in the first counting means into the second counting means at the end of each particular timing interval, and gating means interconnected with said pickups and the input to said second counting means to provide an indication in the second counting means of the time for the movement of the reference quantity between the first and second pickups.

7. In combination for measuring the transfer of a material including a reference material, a first pickup responsive to the transfer of said material to produce a series of flow signals each occurring at a time that an increment of said material is transferred and also responsive to the movement of the reference material past the first pickup, a second pickup responsive to the movement of the reference material past the second pickup, first counting means interconnected with said first pickup for continuosly receiving said flow signals and accumulating a count of said flow signals, second counting means having an input for receiving a count from said first counting means and for measuring the time for the movement of the reference material past the first and second pickups, timing means operatively coupled to the first counting means for producing a timing signal upon each occurrence of a particular count in the first counting means, means operatively coupled to the timing means and the first and second counting means for obtaining a transfer of the count in the first counting means to the second counting means a particular time after each production of the timing signal, and gating means interconnected with said first and second pickups and the input to said second counting means for obtaining a count by the second counter of the time for the movement of the reference material between the first and second pickups.

References Cited
UNITED STATES PATENTS 2,948,470  9/1960  Berkley _____ 235—92
3,254,523  6/1966  Fisher _____ 73—3

FOREIGN PATENTS 900,850  7/1962  England.

MAYNARD R. WILBUR, *Primary Examiner.*

G. J. MAIER, *Assistant Examiner.*